United States Patent
Scheibli

(10) Patent No.: US 7,318,148 B2
(45) Date of Patent: Jan. 8, 2008

(54) AUTOMATICALLY CONFIGURING A COMPUTER

(75) Inventor: Daniel Scheibli, Karlsruhe (DE)

(73) Assignee: SAP AG, Walldorf (DE)

( * ) Notice: Subject to any disclaimer, the term of this patent is extended or adjusted under 35 U.S.C. 154(b) by 516 days.

(21) Appl. No.: 10/901,191

(22) Filed: Jul. 29, 2004

(65) Prior Publication Data
US 2005/0091349 A1    Apr. 28, 2005

Related U.S. Application Data

(60) Provisional application No. 60/491,232, filed on Jul. 31, 2003.

(51) Int. Cl.
G06F 9/24    (2006.01)
G06F 15/177    (2006.01)
G06F 1/24    (2006.01)
G06F 15/16    (2006.01)

(52) U.S. Cl. .............................. 713/1; 713/2; 713/100; 709/220; 709/227

(58) Field of Classification Search ............ 713/1
See application file for complete search history.

(56) References Cited

U.S. PATENT DOCUMENTS
2003/0005096 A1    1/2003    Paul et al.

FOREIGN PATENT DOCUMENTS
WO    WO 00/54149 A2    9/2000
WO    WO 01/29661 A2    4/2001

*Primary Examiner*—Rehana Perveen
*Assistant Examiner*—Stefan Stoynov
(74) *Attorney, Agent, or Firm*—Finnegan, Henderson, Farabow, Garrett & Dunner, L.L.P.

(57) ABSTRACT

Methods, systems, and computer product products are provided for automatically configuring hardware, such as a new computer within a computer network. To allow fast booting, a generic part of an operating system may be loaded onto the new computer. Hardware properties of the new computer may be identified using the generic part of the operating system. Further, a request may be made for the preparation of a hardware specific part of the operating system depending on the identified hardware properties of the new computer. Additionally, at least part of the hardware specific part of the operating system may be communicated between the computer network and the new computer.

33 Claims, 4 Drawing Sheets

AUTOMATICALLY CONFIGURING A COMPUTER

RELATED APPLICATIONS

This application claims the benefit of priority of U.S. Provisional Application No. 60/491,232, filed Jul. 31, 2003, which is expressly incorporated herein by reference to its entirety.

FIELD

The present invention relates to systems, methods and computer program products for automatically configuring hardware, such as a new computer within a computer network. The invention also relates to systems, methods and computer program products for configuring a plurality of computers within a computer network.

BACKGROUND

A new computer may be understood in the sense that it is introduced within a network. The computer is a new member within the network, but needs not to be new in the sense of being unused. It may be possible to move, and shift computers within different networks. Once the computer is connected to a network it is new until it has been configured. The computer may as well be understood as a new server, or just a server.

In computer environments with a plurality of computers, such as environments implementing blade server technology, it is necessary that the system administrator has knowledge about all installed computers and services or sets of services. Further, the deployment of new servers should be possible without any human interaction and within minimum time. Booting of new servers should be possible within short time.

A server may stand for a computer (i.e., a processor with memory) that executes the service. A set of servers is made up of at least one computer, or server (e.g., with a processor and memory).

Computers may provide services to service customers. A service may stand for software that is part of a business application, for example, a database node, an application component, a J2EE engine, an Internet portal, etc. A set of services may stand for at least one service. Conveniently, a set of services may make up an Enterprise Service Architecture (ESA).

To provide reliable services or sets of services, complex network architectures are necessary. The costs in such data centers are growing exponentially with the complexity of the installation. New services and infrastructure, such as new computers, require manual labor and are cost intensive. Also, changes within the environment, as well as changing requirements of the services, require manual labor.

Installing new services or sets of services, as well as meeting increased requirements for existing services, often requires adding new servers, computers and/or services to a data center. The installation causes many actions to be carried out and an unpredictable time is needed. In particular, in a computing on demand approach, the computers and servers have to be installed quickly. The actions taken to provide a computer within a computer network are mostly standardized. In a productive environment, which is a computer environment installed for a customer to provide a set of services, these tasks have to be carried out quickly, as down time is expensive. In today's environments, all tasks are done manually by the system administrators.

Furthermore, during installation of a new server within a server rack, current methods need to boot the server manually or automatically at least twice. The boot process consumes a lot of time, as large memory blocks are used in current servers, which are checked during each boot. This consumes a lot of time.

The Total Costs of Ownership (TCO) could be decreased by introducing methods for automatically installing new computers within a computer network within a short time. In the case of a large number of services and/or servers that are to be deployed, bringing up a new server requires manual interaction and time. The Total Cost of Ownership of computer networks is thus increased. Service level agreements within productive environments, such as maximum down time, maximum response time, maximum repair time and many others, are subject to time limitation due to boot processes.

SUMMARY

According to one aspect of the invention, systems, methods and computer program products are provided for configuring hardware, such as new computers. Such systems, methods and computer program products may be implemented to allow the deployment of new computers without any human interaction and/or with minimum time. In one embodiment, a method is provided for automatically configuring a new computer within a computer network. The method may include the steps of loading a generic part of an operating system (OS) onto the computer, identifying hardware properties of the computer by using the generic part of the OS, the computer requesting a preparation of hardware specific data for the OS by the computer network depending on the identified hardware properties of the computer, and communicating the hardware specific data for the OS at least partially between the computer network and the computer.

According to this method, it may be possible to run an operating system by just booting it once. There is no need for re-booting the computer, thus, the computer may be booted only once during its lifetime. By using a generic part of an operating system, similar servers may be installed with the same generic part of the operating system. Differences between the servers require different booting strategies and processes, which are provided by the variable part of the operating system. This variable part of the operating system may be comprised of files and system parameters. The variable part of the operating system may be communicated between the computer and the computer network, e.g., by transmitting files and information, or may be partially run on request on a server within the computer network. A significant reduction of time may be accomplished by using methods consistent with the present invention. This may be achieved by eliminating any need for a re-boot and by using pre-build images. Customers are able to integrate new servers into data centers without loss in time due to installing an operating system on the new servers.

In accordance with an embodiment of the invention, a generic part of an operating system may be loaded onto the computer via the computer network. This generic part may be identical for every new computer. The generic part may include these parts of an operating system, which are to be used obligatory during a boot of a computer.

Consistent with another embodiment, hardware properties such as CPU's, RAM, PCI-IDs, MAC-addresses, hard disk drives, network interfaces, graphic interfaces, graphic cards, communication interfaces and many more may be identified using the generic part of the operating system. All these hardware components might have to be installed during booting the computer. By identifying these hardware properties, the generic part of the OS, e.g., a linuxrc file, may also prepare a set of data including some of these properties,.to be sent to the computer network. Also, all hardware properties may be sent to the computer network and the relevant information may be extracted within the computer network.

Thus, in one embodiment, hardware specific data may be requested to be prepared within the computer network. These hardware specific data may be configuration files for configuring the computer as well as executable files and libraries or drivers.

According to a preferred embodiment, prior to loading the generic part, a pre-boot execution environment (PXE) of a BIOS may be started within the computer and a PXE request may be broadcasted from the computer into the computer network. A PXE request may be similar to a Dynamic Host Configuration Protocol (DHCP) request. As the computer does not know any address of any server within the computer network, the PXE request may be sent in broadcast mode. That means that every computer within the computer network hears this request.

According to another preferred embodiment, upon reception of the PXE request from the computer, a server within the computer network may broadcast a PXE reply to the computer providing at least an address of a server within the computer network as well as a file name. Any server, which is able to reply to a PXE request, may answer to the broadcasted PXE request. This may be a domain host configuration protocol server. The domain host configuration protocol server answering the PXE request may provide at least a name and an IP-address of a trivial file transfer protocol (TFTP) server or a domain host configuration protocol-server within the network. Further, it may provide a file name of a bootloader. It may also provide network configuration information, such as IP-address, subnet-mask, gateway and further information, for using the computer within the computer network. The PXE reply may be sent in a unicast mode to the computer, in case the MAC-address of the computer has already been sent to the computer network during the PXE request.

In accordance with another embodiment of the invention, upon reception of the PXE reply within the computer, the bootloader may be requested from the server within the computer network and transmitted from the server to the computer and executed within the computer. The PXE reply may comprise the IP-address of an TFTP-server and the file name of the bootloader. Therefore, the computer may request the bootloader and receive the corresponding file being transmitted from the server to the computer. The bootloader allows booting any operating system. In the present case, the bootloader may only allow booting of the one operating system which should be used for the computer.

As disclosed herein, the bootloader may request boot configuration parameters from the computer network. These configuration parameters may allow the selection of a central operating system.

In accordance with one embodiment, a kernel of the operating system may be requested from the computer network and transmitted from the computer network to the computer. A kernel is a central process for each operating system. For example within Linux, the file linuxrc may be a file, script, which is executed within the kernel during booting. The kernel allows booting a computer up to a certain point where further, hardware specific data are required. A kernel is obligatory for each operating system to run.

In another embodiment, an initial RAM disk may be requested from the computer network and transmitted from the computer network to the computer. The initial random access memory disk may comprise essential files and configuration information for booting the computer. These files may be drivers for network interface cards or DHCP clients to be run on the computer.

According to yet another embodiment, a network interface card (NIC) may be identified within the computer by the generic part of the operating system and a driver for the NIC may be loaded from the RAM disk by the generic part of the operating system. Thus, a network interface card is ready to be run. A DHCP client may be run on the network interface card. The DHCP client may not know the actual address (IP-address, name) of a DHCP server within the computer network. It is also possible that the DHCP client may retrieve an address of a DHCP server within the computer network from a file entry within the RAM disk.

In case the DHCP client does not know the actual address of the DHCP server within the computer network, the DHCP client may be executed within the computer and the DHCP client may broadcast a temporary identification request for the computer. As the DHCP client does not know the actual address of the DHCP server, it broadcasts its DHCP request into the computer network. Any DHCP server within the computer network may answer this request.

The temporary identification for the computer may be provided out of an address range upon reception of the temporary identification request from the DHCP server. The request for a temporary identification may be a DHCP request.

This DHCP request, in case it needs to be broadcasted, may first broadcast a DHCP discover message. This is a general request for network configuration information. This request may also comprise the MAC-address of the computer. A server receiving this DHCP discover message may transmit in a unicast mode configuration information for configuring the DHCP client within a DHCP offer message to the computer using the MAC-address. The computer, after reception of a DHCP offer message, may send a DHCP request message, choosing any one of the possible configurations. Furthermore, the DHCP client may ask the respective DHCP server, whether this configuration is still valid. The respective server answers in a DHCP acknowledge message, that the proposed configuration is still valid. After receiving this DHCP acknowledge message, the DHCP client may configure itself according to the proposed network configuration. The IP-address provided for the DHCP client may be chosen from a range of IP-addresses.

In accordance with another embodiment, the hardware properties of the computer may be transferred from the computer to the computer network and analyzed within the computer network and the hardware specific data for the operating system may be created or restored depending whether the hardware properties of the computer are already known within the computer network or not. First, the MAC-address of the computer is analyzed. In case this MAC-address is already known, the computer has at least once been registered within the computer network. Its configuration files are known and might be restored. In this case, the computer might be booted using the already stored configuration information. Otherwise, the MAC-address is not known. Then, the DHCP server stores the new MAC-address. The domain host configuration protocol configuration of the domain host configuration protocol server is updated according to the information about the computer. Together with storing the MAC-address, a variable part (var-image) of the operating system is created for the computer. The var-image of the operation system may comprise files and configuration information. The var-image may vary, according to the individual hardware specific data. Once the var-image has been created or adapted from a pre-build var-image, the computer receives an acknowledge messages.

In accordance with still another embodiment, the DHCP client of the computer may be restarted and broadcast a permanent identification request for the computer to the computer network using a MAC-address of the network interface card and wherein the computer network transmits a permanent identification for the computer upon reception of the permanent identification request using the MAC-address of the computer. Now the computer already knows configuration information for configuring within the computer network. Only a permanent IP-address may have to be assigned to the computer.

According to another embodiment, the computer may receive and/or request configuration data using the hardware specific data stored within the computer network for finalizing its configuration. The boot process may be finalized by using the var-image, e.g., the data stored in the var-image. This data may be files and configuration information. For finalizing the boot process, files may be transferred to the computer. Also, configuration information may be communicated to the computer. It is not necessary that files have to be transferred via the computer network. Within the var-image, selected files to be transferred may be stored. DHCP options may be included within the DHCP reply of the server. These DHCP options may comprise names of drives, mount points, paths, and many more. Mount points allow mounting the drives onto the computer. The drives do not necessarily have to be stored on the computer.

A further aspect of the invention relates to a computer system for automatically configuring a computer within a computer network. The computer system may include means for requesting from a computer within the computer network a generic part of an operating system by the new computer to be loaded onto the new computer, means for identifying within the new computer hardware properties of the new computer by using the generic part of the operating system, means for executing a domain host configuration protocol client within the computer, means for broadcasting a temporary identification request for the computer from the domain host configuration protocol client into the computer network, means for requesting from the computer network a preparation of a hardware specific part of the operating system by the new computer depending on the identified hardware properties of the new computer, means for restarting the domain host configuration protocol client of the new computer, means for broadcasting a permanent identification requests for the new computer from the domain host configuration protocol client into the computer network using a MAC address of a network interface card, means for transmitting a permanent identification for the new computer from the computer network to the new computer upon reception of the permanent identification request using the MAC address of the new computer, means for communicating the hardware specific data for the operating system at least partially between the computer network and the new computer, and means for finalizing booting the new computer by executing the hardware specific part of the operating system within the new computer.

In one preferred embodiment, the computer may comprise a BIOS with a pre-boot execution environment (PXE) and broadcasting means for broadcasting from the computer a PXE request into the computer network.

In another preferred embodiment, the computer network may comprise at least one server for providing upon reception of the PXE request a PXE reply comprising at least an address of a server within the computer network and a filename of a bootloader to the computer.

According to yet another embodiment, the computer may comprise means for receiving and executing a bootloader provided by the computer network.

In a further embodiment, the computer may comprise means for requesting and executing a kernel of the OS.

It is also proposed that the computer comprises means for storing an initial RAM disk requested from the computer network and transmitted from the computer network to the computer.

Computer systems consistent with the invention may also include a computer where the computer comprises a network interface card (NIC) identified by the generic part of the OS and a driver for the NIC that is stored within and loaded from the RAM disk by the generic part of the OS.

Computer systems consistent with the invention may also include a computer where the computer comprises an execution environment for executing a dynamic host configuration protocol (DHCP) client and broadcasting means for broadcasting from the DHCP client a temporary identification request for the computer from a DHCP within the computer network.

Another embodiment proposes that the computer network comprises means for analyzing the transferred hardware properties of the computer and means for creating the hardware specific data for the operating system.

A further embodiment proposes that the computer network comprises means for storing a MAC address of the NIC of the computer and means for accessing the hardware specific data by the MAC address.

A further aspect of the invention relates to a computer-readable medium containing a computer program product for automatically configuring a computer within a computer network. The product may comprise instructions for requesting from a computer within the computer network a generic part of an operating system by the new computer to be loaded onto the new computer, identifying within the new computer hardware properties of the new computer by using the generic part of the operating system, executing a domain host configuration protocol client within the computer broadcasting a temporary identification request for the computer from the domain host configuration protocol client into the computer network, requesting from the computer network a preparation of a hardware specific part of the operating system by the new computer depending on the identified hardware properties of the new computer, restarting the domain host configuration protocol client of the new computer, broadcasting a permanent identification requests for the new computer from the domain host configuration protocol client into the computer network using a MAC address of a network interface card receiving a permanent identification for the new computer from the computer network communicating the hardware specific data for the operating system at least partially between the computer network and the new computer, and finalizing booting the new computer by executing the hardware specific part of the operating system within the new computer.

Yet a further aspect of the invention relates to a method of deploying new computers within a computer network. The method may include providing a generic part of an operating system to the computer, assembling hardware specific data for the operating system depending on hardware properties of new computers, communicating the hardware specific data between the new computer and the computer network at least partially, using the generic part of the operating system to identify hardware properties of the new computer, broadcasting a temporary identification request into the computer network, broadcasting a permanent identification requests for the new computer into the computer network using a MAC address of a network interface card, receiving a permanent identification for the new computer from the computer network, and requesting a preparation of hardware specific data for the operating system depending on the identified hardware properties of the new computer.

Another aspect of the invention relates to systems for deploying a plurality of computers within a computer network. The system may comprise means for deploying new computers within the computer network, the deploying means comprise means for providing a generic part of an operating system to a computer, means for assembling hardware specific data for the operating system depending on hardware properties of new computers, means for using the generic part of the operating system to identify hardware properties of the new computer, means for requesting by the computer a preparation of hardware specific data for the operating system by the assembling means depending on the identified hardware properties of the computer, and means for communicating at least partially the hardware specific data for the operating system between the computer and the computer network.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this application, illustrate embodiments of the invention and together with the description, serve to explain the principles and aspects of the invention. In the figures.

DETAILED DESCRIPTION

Reference will now be made in detail to exemplary embodiments of the invention, examples of which are illustrated in the accompanying drawings. Wherever convenient, the same reference numbers are be used throughout the drawings to refer to the same or like parts.

Embodiments of the invention may be computerized and implemented with any suitable combination of hardware, software and/or firmware. In one embodiment, the present invention is implemented by computers within a computer network. An example of such a computer system is illustrated in connection with FIG. 1.

Figure 1:
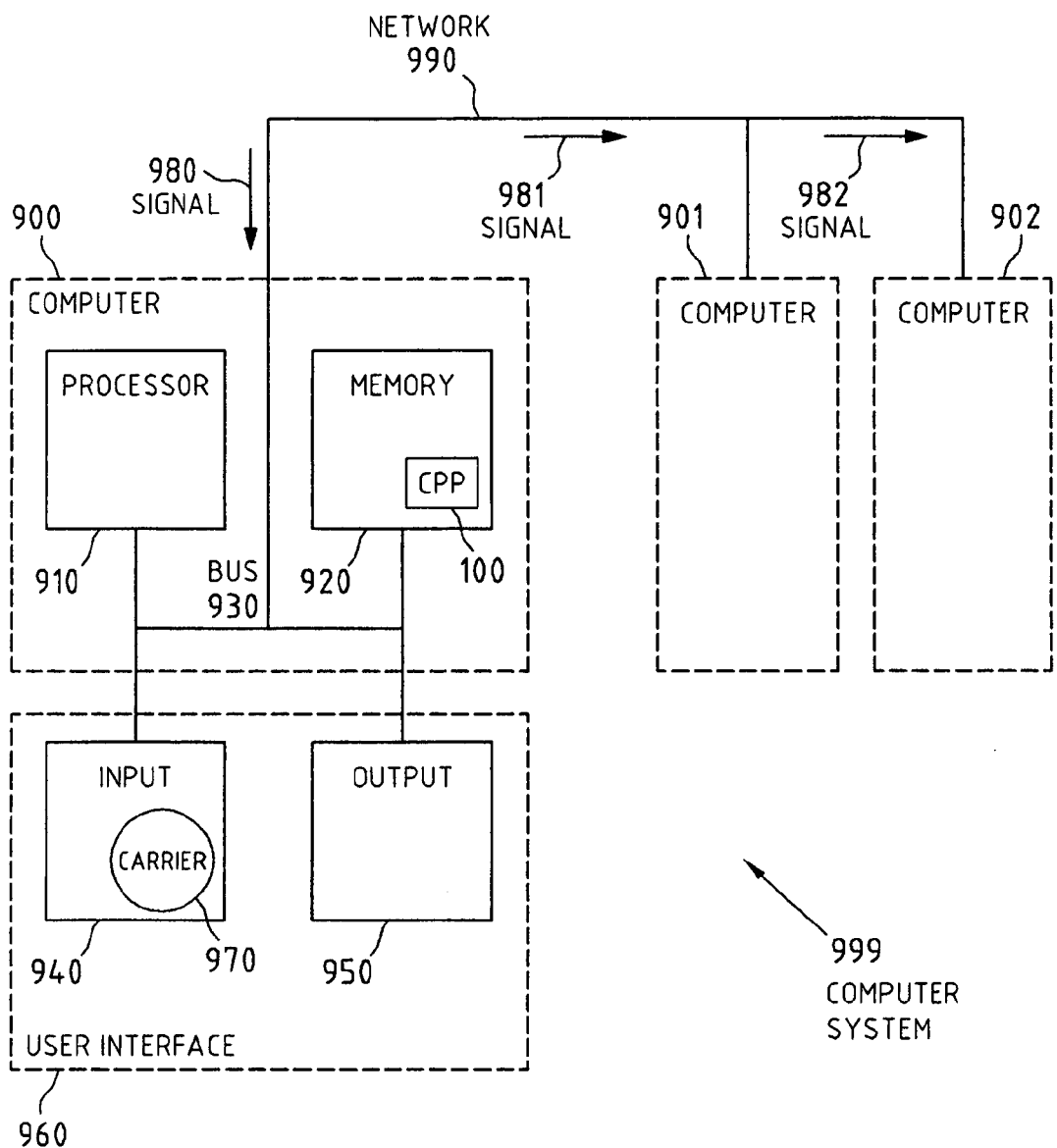
FIG. 1 illustrates a block diagram of an exemplary computer system, consistent with an embodiment of the invention.

In FIG. 1, a simplified block diagram is provided of exemplary computer system 999 having a plurality of computers 900, 901, 902 (or even more).

Computer 900 can communicate with computers 901 and 902 over a network 990. Computer 900 may include a processor 910, a memory 920, a bus 930, and, optionally, an input device 940 and an output device 950 (I/O devices, which may be provided as part of a user interface 960). As illustrated, embodiments or features of the invention may be implemented by a computer program product 100 (CPP), a carrier 970 and/or a signal 980.

With respect to computer 900, computer 901/902 may sometimes referred to as "remote computer". Computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 may comprise elements that temporarily or permanently store data and instructions. Although memory 920 is illustrated as part of computer 900, memory can also be implemented in network 990, in computers 901/902, in processor 910 (e.g., a cache or register), and/or elsewhere. Memory 920 can be a read only memory (ROM), a random access memory (RAM), or a memory with other access options. Memory 920 may be physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); or (c) semiconductor media, like DRAM, SDRAM, EPROM, EEPROM, memory stick or the like.

Optionally, memory 920 is distributed. Portions of memory 920 can be removable or non-removable. For reading from media and for writing in media, computer 900 may use well-known devices, for example, disk drives or tape drives.

Memory 920 stores modules such as, for example, a basic input output system (BIOS), an operating system operating system, a program library, a compiler, an interpreter, and a text-processing tool. Modules are commercially available and can be installed on computer 900. For simplicity, these modules are not illustrated.

CPP 100 has program instructions and—optionally—data that cause processor 910 to execute embodiments of the present invention. In other words, CPP 100 can control the operation of computer 900 and its interaction in network system 999 so that is operates to perform in accordance with embodiments of the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods consistent with the present invention. Further, signal 980 can also embody computer program product 100.

Having described CPP 100, carrier 970, and signal 980 in connection with computer 900 is convenient. Optionally, further carriers and/or further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disk drive. Although the examples are devices with human interaction, device 940 can also be a device without human interaction, for example, a wireless receiver (e.g., with satellite dish or terrestrial antenna), a sensor (e.g., a thermometer), or a counter (e.g., a goods counter in a factory). Input device 940 can serve to read carrier 970.

Output device 950 presents instructions and data that have been processed. For example, this can be a monitor or a display (e.g., a cathode ray tube (CRT), a flat panel display, or liquid crystal display (LCD)), a speaker, a printer, a plotter, a vibration alert device, and/or the like. Output device 950 can communicate with the user, but it can also communicate with further computers.

Input device 940 and output device 950 may be combined into a single device. Additionally, either or both of the devices 940 and 950 may be provided optionally.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways that are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., the world wide web or WWW). Network 990 can be a wired or a wireless network. To name a few network implementations, network 990 can be, for example, a local area network (LAN), a wide area network (WAN), a public switched telephone network (PSTN); an Integrated Services Digital Network (ISDN), an infra-red (IR) link, a radio link such as Universal Mobile Telecommunications System (UMTS), a Global System for Mobile Communication (GSM) network, a Code Division Multiple Access (CDMA) network, or a satellite link.

A variety of transmission protocols, data formats and conventions are known, for example, as transmission control protocol/internet protocol (TCP/IP), hypertext transfer protocol (HTTP), secure HTTP, wireless application protocol (WAP), unique resource locator (URL), unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provides", are convenient abbreviations to express actions by a computer that is controlled by a program.

Figure 2:
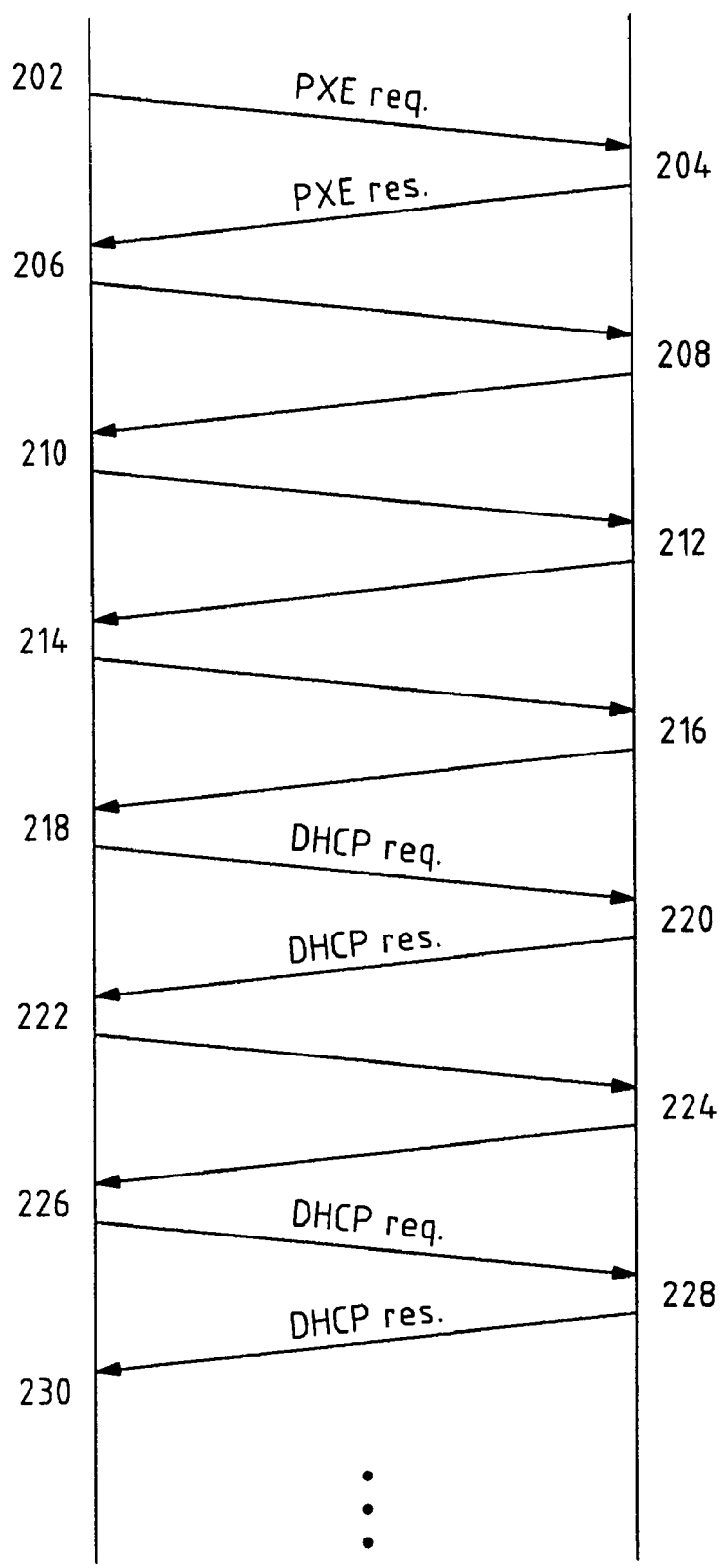
FIG. 2 illustrates a flowchart of an exemplary method, consistent with an embodiment of the invention.

In accordance with an embodiment of the invention, FIG. 2 depicts a succession of requests and responses that may be performed between a computer to be configured (e.g., a new computer) and a computer network. In step 202, the computer is powered ON and after a while, e.g., after passing a Power On Self Test, executes the pre-boot execution environment of its BIOS. The pre-boot execution environment (PXE) transmits a PXE request to the computer network in, for example, a broadcast mode. Thus, all computers within the computer network may receive such a PXE request. The PXE request may be similar to a domain host configuration protocol request. PXE requests may only transfer less data than domain host configuration protocol requests, e.g., IP addresses of TFTP servers might not be transferred.

In step 204, any server within the computer network receives the above-mentioned PXE request. Domain host configuration protocol servers within the computer network receiving the PXE request may answer to this request. In particular, for initializing a computer within a network, one domain host configuration protocol server may act as a control station. In the following, the domain host configuration protocol server answering the requests may be such a control station. In the PXE response, which is also broadcasted, the Control Station may provide its MAC-address, network configuration information such as IP-address, subnet-mask, gateway, name of a TFTP server, IP-address of such a server and/or name of a bootloader. As of the broadcast, every computer within the computer network may receive the PXE response message. That means that also the new computer receives the PXE response.

In step 206, the computer has received the PXE response. By using the network information, in particular the IP-address of the TFTP server and the name of the bootloader, the computer may request via a Trivial File Transfer Protocol (TFTP) the bootloader file from the domain host configuration protocol server which has answered the PXE request.

In step 208, the TFTP deamon receives the request for the bootloader and provides this bootloader to the computer. This is done in a unicast mode, as the address of the computer is known now.

In step 210, the computer receives the bootloader and executes it. During execution of the bootloader, the computer may request in a unicast mode from the TFTP server the configuration information for the bootloader.

This request is received in step 212 and answered by providing the requested information. In step 214, the bootloader proceeds according to the received configuration information. It may be possible that the bootloader only provides the possibility of booting one operation system. In case no manual interaction should happen, this may be preferred. The bootloader then may request a kernel of an operating system and an initial random access memory disk. By way of a non-limiting example, this may be a linux kernel together with its initial random access memory disk. In step 214, the computer requests the kernel and the random access memory disk. In step 216, the deamon TFTP server receives the requests and provides the requested files to the computer.

The computer receives in step 218 the requested files, which may be regarded as a generic part of an operating system. After reception of the files, the kernel may be started. The initial random access memory disk is unpacked. In case of linux, the file linuxrc may be executed. The linuxrc may detect a network interface card (network interface card) via a device class request and PCI interface ID. Once the network interface card has been detected, a corresponding driver may be loaded from the random access memory disk. Further, the random access memory disk may provide a domain host configuration protocol client, which is also started for managing the network interface card. As the domain host configuration protocol client does not know a domain host configuration protocol server within the computer network yet, it broadcasts a domain host configuration protocol (DHCP) request requesting domain host configuration protocol configuration information. In step 220, the domain host configuration protocol request may be received by any domain host configuration protocol server within the computer network.

The domain host configuration protocol request and response, as well as the PXE request and response may be carried out in four steps (not depicted in FIG. 2). As a first step, the client may broadcast a domain host configuration protocol discover message. This discover message may comprise requests for network configuration information from any domain host configuration protocol server. Each domain host configuration protocol server receiving such a domain host configuration protocol discover message may send in unicast mode a domain host configuration protocol offer message to the requesting client. Within this domain host configuration protocol offer message, each domain host configuration protocol server may provide a possible network configuration. After reception of the domain host configuration protocol offer message within the client, the client may choose one of the possible network configurations. After choosing one of these configurations, the client may check whether this configuration is still available, and valid within the domain host configuration protocol server. This may be done via a domain host configuration protocol request message. In case the proposed network configuration is still available and valid, the server may confirm this configuration using a domain host configuration protocol acknowledge message. After receiving such a domain host configuration protocol acknowledge message, the client may configure the network interface card according to the proposed configuration. In case the network configuration has become invalid, the domain host configuration protocol server may deny the use of this configuration. The client may then choose another proposed configuration or may request a new configuration.

The above-described method may be carried out between steps 218, 220 and 222. The domain host configuration protocol server provides an IP-address out of an IP-range as a dynamic IP-address for the computer.

In step 220, after receiving or parallel to that, the domain host configuration protocol acknowledge message, hardware properties of the computer are detected. These may include the CPU type, random access memory, PCI-ID, MAC-addresses, graphic interfaces, and/or others. The detected hardware properties are transferred to the domain host configuration protocol server using the IP-address of the domain host configuration protocol server.

In step 224, the domain host configuration protocol server receives the detected hardware configuration of the computer. First of all, the MAC-address of the computer may be analyzed. After that, it may be checked, whether this MAC-address is already known. Only in case the MAC-address is not known, the domain host configuration protocol configuration files may be updated using the information about the computer. Furthermore, a variable part (var-image) of an operation system may be created or adapted from a pre-build one by using the information about the hardware configuration of the computer. The domain host configuration protocol server, e.g. the control station, approves the reception of the hardware configuration to the computer.

Upon reception of this approval, the computer restarts its domain host configuration protocol client in step 226. The domain host configuration protocol client broadcasts again a domain host configuration protocol request to the domain host configuration protocol server in broadcast mode. The domain host configuration protocol server receives in step 228 the domain host configuration protocol request and provides the computer with a static IP-address and further information using the MAC-address of the computer.

In step 230, the computer analyzes the received domain host configuration protocol options, which may be names of drivers, mount points, IP-addresses, paths to root disks, root images and/or others. Further, drivers may be mounted. The var-image may also be mounted via NFS. Then, programs may be executed. The last steps of booting the computer may be done without transferring any files from the domain host configuration protocol server, e.g. the control station to the computer. Information about the configuration and mounting information may be transferred to the computer and the files may be executed. After step 230, the computer is fully booted and ready to be used within the computer network.

Figure 3:
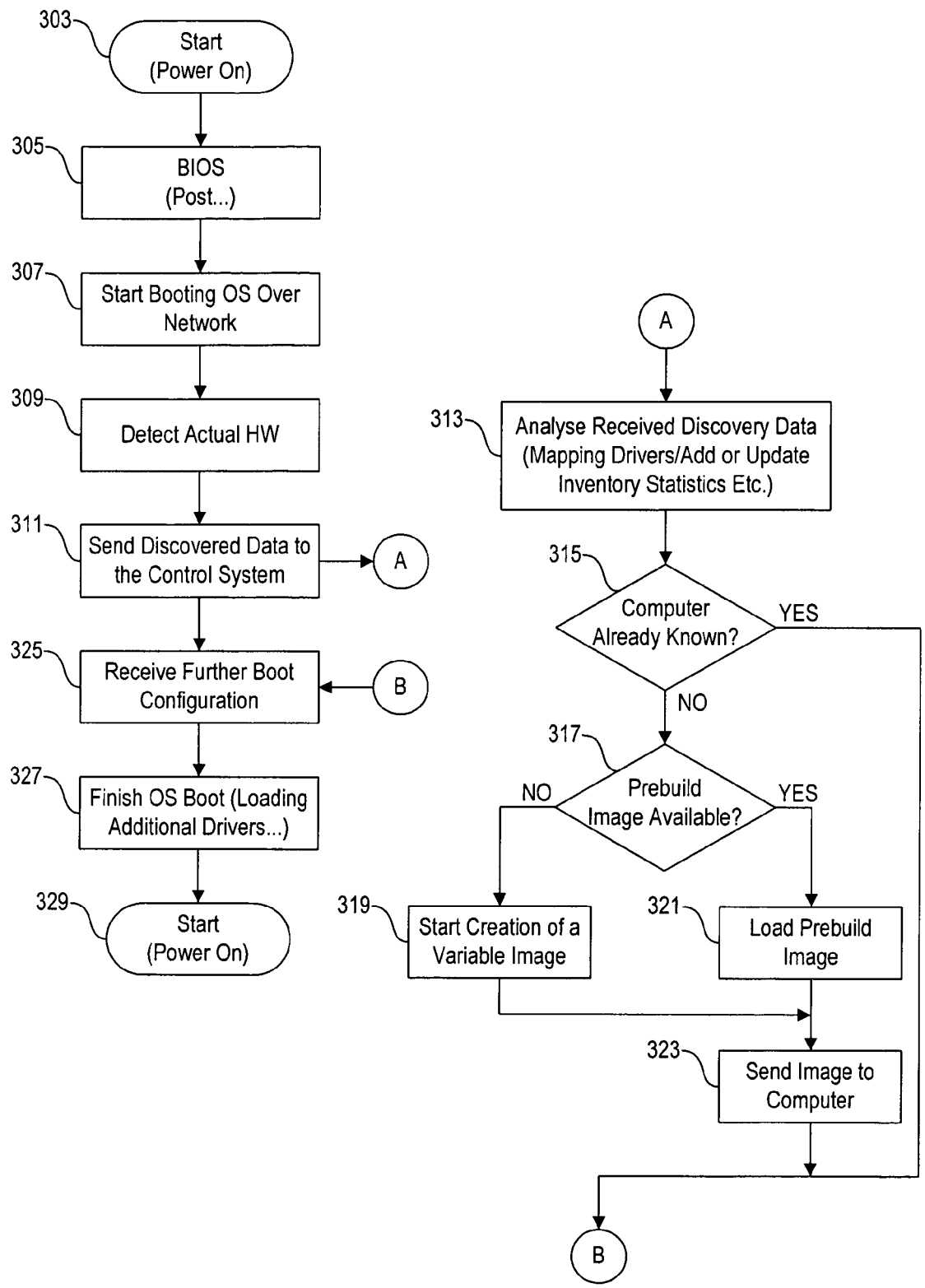
FIG. 3 illustrates a flowchart of another exemplary method, consistent with an embodiment of the invention.

FIG. 3 is a flowchart of an exemplary method, consistent with an embodiment of the invention. The flowchart depicts, among other things, the steps for booting a computer to be configured (e.g., a new computer to be deployed in a computer network). In step 303, the computer is powered ON. In step 305, the BIOS is executed and reaches the point where a bootloader and a kernel may be started. The information needed and files required are requested in step 307 from the network. In step 309, the actual hardware configuration of the computer is detected.

In step 311, the discovered hardware configuration data is sent to the network. The received hardware configuration data is analyzed in step 313. Inventory statistics and domain host configuration protocol configuration files may be updated. In step 315, it is analyzed whether the computer is already known by using its MAC-address. In case the computer is not known, in step 317 it is checked whether a pre-build var-image is available for the particular hardware configuration. If such a pre-build var-images is not available, in step 319 a var-image is created according to the information about the hardware configuration of the computer. In case the computer is known, a pre-build var-image is loaded in step 321.

In step 323, the var-image is made available by providing its location, e.g. path information and file name, to the computer. The computer receives the var-image location information and further boot information in step 325. Using this further information, in step 327 the computer finishes its booting of the operating system. This may be done by loading additional drivers, mounting images and/or configuring network interfaces. In step 329, the computer is ready for use within the computer network.

Figure 4A:
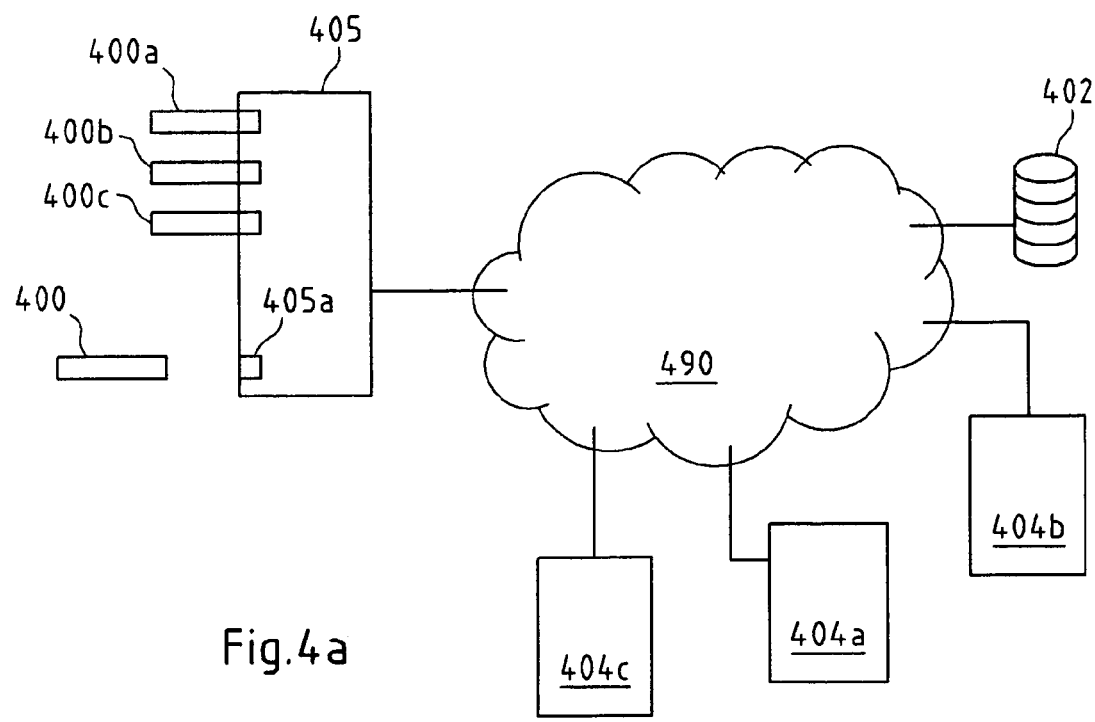
FIGS. 4a and 4b are block diagrams of another exemplary computer system, consistent with an embodiment of the invention.

FIG. 4*a* depicts a block diagram of another exemplary computer system, consistent with an embodiment of the invention. In blade server technology, a server rack 405 may be provided. This server rack 405 may comprise interfaces 405*a*, with a plurality of computers 400*a*, 400*b*, 400*c*. A computer 400 may be plugged into a free interface 405*a* if required.

The server rack is connected to a computer network 490. The computer network 490 connects all computers 400 with all other computers 402, 404 within the computer network 490. The computer network 490 may comprise various computers, such as a TFTP server 402 and a plurality of domain host configuration protocol servers 404*a*-404*c*. To receive network configuration information, the computer 400 may send domain host configuration protocol and PXE requests in broadcast or unicast mode to the computer network 490.

In case of a broadcast mode, each domain host configuration protocol server 404 may receive a domain host configuration protocol request and provide configuration information. The computer 400 may then choose one of the proposed network configurations. For loading files onto the computer 400, these files may be requested from the TFTP server 402. Once the computer 400 knows the IP-address of the TFTP server 402, the files may be transferred from the TFTP server 402 to the computer 400.

Figure 4B:
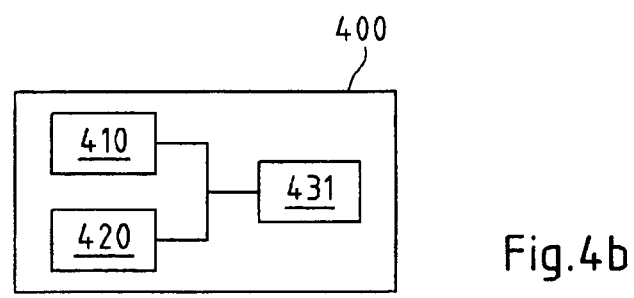

FIG. 4*b* depicts an exemplary block diagram of computer 400. As illustrated, this computer 400 may comprise a CPU 410. The CPU 410 may allow for booting of an operating system. This booting may be done in several steps. First, a generic part of an operating system may be booted. This generic part may be loaded into a memory 420, which is also provided within computer 400. The connection between the computer 400 and the computer network 490 for transferring files and information may be done via a network interface card 431.

A BIOS of the computer 400 provides a pre-boot environment (PXE). The PXE functionality is supported by the network interface card 431. The network interface card 431 may request a generic and a variable part of an operating system from domain host configuration protocol server 404 and TFTP server 402.

First of all, it allows loading the generic part from the TFTP server. Furthermore, it allows loading and accessing information and files within the variable part of the operating system. The network interface card 431 provides a MAC-address. This MAC-address may be assigned first of all to a dynamic IP-address. This dynamic IP-address may be used for finalizing booting. During finalizing booting, the dynamic IP-address may be replaced by a permanent IP-address. This permanent IP-address may be linked to the MAC-address of the network interface card 431. Thus, the computer 400 will be known permanently within the computer network 490, e.g. within domain host configuration protocol servers within the computer network.

Methods and systems consistent with the invention may enable a system administrator to add hardware into a data center efficiently and with ease. As disclosed herein, the time for deployment may be minimized and a plurality of booting processes it not necessary. Accordingly, methods and systems consistent with the present invention may be very helpful to users by saving time while deploying computers.

One of ordinary skill will also recognize that although the embodiments are often described in the context of deploying a new computer, the principles of the invention are broadly applicable to almost any hardware or device to be deployed in a network. Further, other embodiments of the invention will be apparent to those skilled in the art from consideration of the specification and practice of the features and aspects of the invention disclosed herein. Therefore, it is intended that the specification and disclosed embodiments be treated as exemplary only, with a true scope and spirit of the invention being indicated by the following claims.

What is claimed is:

1. A method for automatically configuring a new computer within a computer network during a single boot process, the method comprising the steps of:
   requesting a generic part of an operating system from a computer within the computer network;
   persistently storing the generic part of the operating system on the new computer;
   identifying, within the new computer, hardware properties of the new computer by using the generic part of the operating system;
   executing a dynamic host configuration protocol client within the new computer;
   broadcasting a temporary network address request for the new computer from the dynamic host configuration protocol client into the computer network;
   requesting from the computer network a preparation of a hardware specific part of the operating system by the new computer depending on the identified hardware properties of the new computer;
   restarting the dynamic host configuration protocol client of the new computer;
   broadcasting a permanent network address request for the new computer from the dynamic host configuration protocol client into the computer network using a MAC address of a network interface card;
   transmitting a permanent network address for the new computer from the computer network to the new computer upon receipt of the permanent network address request using the MAC address of the new computer;
   communicating at least a part of the hardware specific data of the operating system between the computer network and the new computer;
   persistently storing the hardware specific part of the operating system on the new computer; and
   finalizing booting the new computer by executing the hardware specific part of the operating system within the new computer.

2. The method of claim 1, wherein a pre-boot environment of a BIOS is started within the new computer and wherein said pre-boot environment broadcasts from the new computer a pre-boot environment request into the computer network.

3. The method of claim 2, wherein upon reception of the pre-boot environment request from the new computer, a server within the computer network broadcasts a pre-boot environment reply to the new computer providing at least an address of a server within the computer network and a filename of a bootloader.

4. The method of claim 2, wherein upon reception of the pre-boot environment reply within the new computer, a bootloader is requested from the server within the computer network and transmitted from the server to the new computer and executed within the new computer.

5. The method of claim 4, wherein the bootloader requests boot configuration parameters from the computer network.

6. The method of claim 1, wherein requesting the generic part of the operating system comprises:
   requesting a kernel of the operating system from the computer network; and
   transmitting the kernel from the computer network to the new computer.

7. The method of claim 1, wherein requesting the generic part of the operating system comprises:
   requesting an initial RAM disk from the computer network and transmitting the RAM disk from the computer network to the new computer.

8. The method of claim 1, wherein identifying the hardware properties comprises:
   identifying a network interface card within the new computer based on the generic part of the operating system; and
   loading a driver for the network interface card from a RAM disk based on the generic part of the operating system.

9. The method of claim 1, wherein the temporary network address for the new computer is provided upon receipt of the temporary network address request from a dynamic host configuration protocol server out of an address range.

10. The method of claim 1, wherein executing the dynamic host configuration protocol client comprises:
    transferring the hardware properties of the new computer from the new computer to the computer network; and
    analyzing the hardware properties within the computer network; and
    creating the hardware specific data for the operating system depending on whether the hardware properties of the new computer are already known within the computer network.

11. The method of claim 10, wherein configuration files of a dynamic host configuration protocol server within the computer network are updated according to the received hardware properties of the new computer.

12. The method according to claim 10, wherein a MAC address of a network interface card of the new computer is stored within the dynamic host configuration protocol server and wherein access to the hardware specific data is done via the MAC address.

13. The method of claim 1, wherein broadcasting the permanent network address request comprises:
    receiving configuration data at the new computer based on the hardware specific data stored within the computer network.

14. A computer system for automatically configuring a new computer within a computer network during a single boot process, the system comprising:
    means for requesting from the computer network a generic part of an operating system to be loaded onto the new computer;
    means for persistently storing the generic part of the operating system on the new computer;
    means for identifying hardware properties of the new computer based on the generic part of the operating system;
    means for executing a dynamic host configuration protocol client within the new computer;
    means for broadcasting a temporary network address request for the new computer from the dynamic host configuration protocol client into the computer network;
    means for requesting from the computer network a hardware specific part of the operating system depending on the identified hardware properties of the new computer;
    means for restarting the dynamic host configuration protocol client of the new computer;
    means for broadcasting a permanent network address request for the new computer from the dynamic host configuration protocol client into the computer network using a MAC address of a network interface card;
    means for transmitting a permanent network address for the new computer from the computer network to the new computer upon reception of the permanent network address request using the MAC address of the new computer;
    means for communicating at least a part of the hardware specific data for the operating system at least partially between the computer network and the new computer;
    means for persistently storing the hardware specific part of the operating system on the new computer; and
    means for finalizing booting the new computer by executing the hardware specific part of the operating system within the new computer.

15. The computer system of claim 14, wherein a pre-boot environment of a BIOS is started within the new computer and wherein said pre-boot environment broadcasts from the new computer a pre-boot environment request into the computer network.

16. The computer system of claim 15, wherein upon reception of the pre-boot environment request from the new computer a server within the computer network broadcasts a pre-boot environment reply to the new computer providing at least an address of a server within the computer network and a filename of a bootloader.

17. The computer system of claim of claim 15, wherein upon reception of the pre-boot environment reply within the new computer a bootloader is requested from the server within the computer network and transmitted from the server to the new computer and executed within the new computer.

18. The computer system of claim 17, wherein the bootloader requests boot configuration parameters from the computer network.

19. The computer system of claim 14, further comprising:
    means for requesting a kernel of the operating system from the computer network; and
    means for transmitting the kernel from the computer network to the new computer.

20. The computer system of claim 14, further comprising:
    means for requesting an initial RAM disk from the computer network; and
    means for transmitting the RAM disk from the computer network to the new computer.

21. The computer system of claim 14, further comprising:
    means for identifying a network interface card within the new computer based on the generic part of the operating system; and
    means for loading a driver for the network interface card from a RAM disk based on the generic part of the operating system.

22. The computer system of claim 14, wherein the temporary network address for the new computer is provided upon receipt of the temporary network address request from a dynamic host configuration protocol server out of an address range.

23. The computer system of claim 14, further comprising:
    means for transferring the hardware properties of the new computer from the new computer to the computer network;
    means for analyzing the hardware properties within the computer network; and means for restoring the hardware specific data for the operating system depending whether the hardware properties of the new computer are already known within the computer network.

24. The computer system of claim 23, wherein configuration files of a dynamic host configuration protocol server within the computer network are updated according to the received hardware properties of the new computer.

25. The computer system of claim 23, wherein a MAC address of a network interface card of the new computer is stored within the dynamic host configuration protocol server and wherein access to the hardware specific data is done via the MAC address.

26. The computer system of claim 14, further comprising:
   means for receiving configuration data at the new computer based on the hardware specific data stored within the computer network.

27. A computer program product stored in a computer-readable medium with program instructions that can be executed to perform a method for automatically configuring a new computer within a computer network during a single boot process, the method comprising:
   requesting from a computer within the computer network a generic part of an operating system to be loaded onto the new computer;
   persistently storing the generic part of the operating system on the new computer;
   identifying, within the new computer, hardware properties of the new computer by using the generic part of the operating system;
   executing a dynamic host configuration protocol client within the new computer;
   broadcasting a temporary network address request for the new computer from the dynamic host configuration protocol client into the computer network;
   requesting from the computer network a preparation of a hardware specific part of the operating system depending on the identified hardware properties of the new computer;
   restarting the dynamic host configuration protocol client of the new computer;
   broadcasting a permanent network address requests for the new computer from the dynamic host configuration protocol client into the computer network using a MAC address of a network interface card;
   receiving a permanent network address for the new computer from the computer network;
   communicating the hardware specific data for the operating system at least partially between the computer network and the new computer;
   persistently storing the hardware specific part of the operating system on the new computer; and
   finalizing booting the new computer by executing the hardware specific part of the operating system within the new computer.

28. The computer program product of claim 27, wherein a pre-boot environment of a BIOS is started within the new computer and wherein said pre-boot environment broadcasts from the new computer a pre-boot environment request into the computer network.

29. The computer program product of claim 27, wherein requesting the generic part of the operating system comprises:
   requesting a kernel of the operating system from the computer network; and
   transmitting the kernel from the computer network to the new computer.

30. The computer program product of claim 27, wherein identifying the hardware properties of the new computer comprises:
   identifying a network interface card within the new computer based on the generic part of the operating system; and
   loading a driver for the network interface card from a RAM disk based on the generic part of the operating system.

31. The computer program product of claim 27, wherein configuration files of a dynamic host configuration protocol server within the computer network are updated according to the received hardware properties of the new computer.

32. A method of deploying new computers within a computer network, the method comprising:
   providing a generic part of an operating system to each new computer;
   persistently storing the generic part of the operating system on each new computer;
   identifying hardware properties of each new computer based on the generic part of the operating system;
   assembling hardware specific data for the operating system depending on hardware properties of each new computer;
   communicating a hardware specific part of the operating system to each new computer;
   persistently storing the hardware specific part of the operating system on each new computer;
   broadcasting a temporary network address request into the computer network;
   broadcasting a permanent network address requests for each new computer into the computer network using a MAC address of a network interface card; and
   receiving a permanent network address for each new computer from the computer network.

33. A method according to claim 32, wherein the method further comprises:
   finalizing booting each new computer by executing the hardware specific part of the operating system within each new computer.

* * * * *